(12) United States Patent
Unger

(10) Patent No.: US 7,733,294 B2
(45) Date of Patent: *Jun. 8, 2010

(54) METHOD AND SYSTEM FOR WIRELESS TRANSMISSION

(75) Inventor: Robert Allan Unger, El Cajon, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1290 days.

This patent is subject to a terminal disclaimer.

(21) Appl. No.: 11/231,051

(22) Filed: Sep. 20, 2005

(65) Prior Publication Data

US 2006/0092959 A1 May 4, 2006

Related U.S. Application Data

(63) Continuation-in-part of application No. 11/011,865, filed on Dec. 13, 2004, now Pat. No. 7,353,158, and a continuation-in-part of application No. 11/036,479, filed on Jan. 13, 2005, now Pat. No. 7,675,509.

(60) Provisional application No. 60/624,940, filed on Nov. 3, 2004.

(51) Int. Cl.
*G09G 5/00* (2006.01)
(52) U.S. Cl. .................. 345/2.3; 345/538; 710/310; 370/412
(58) Field of Classification Search ............. 345/504, 345/2.3, 1.2, 538, 541; 709/204, 205, 208; 370/310, 412; 710/310
See application file for complete search history.

(56) References Cited

U.S. PATENT DOCUMENTS

| | | | |
|---|---|---|---|
| 5,808,760 A * | 9/1998 | Gfeller | 398/27 |
| 6,195,687 B1 | 2/2001 | Greaves et al. | 709/208 |
| 6,553,434 B1 * | 4/2003 | Abkarian et al. | 710/18 |
| 6,583,904 B1 * | 6/2003 | Mahlab et al. | 398/129 |
| 6,661,360 B2 | 12/2003 | Lambert | |
| 6,665,497 B1 | 12/2003 | Hamilton-Gahart et al. | |
| 6,687,315 B2 | 2/2004 | Keevill et al. | |
| 6,703,906 B2 | 3/2004 | Babcock | |
| 6,706,977 B2 | 3/2004 | Cain et al. | |
| 6,710,769 B2 | 3/2004 | Loughran et al. | |
| 6,718,421 B1 | 4/2004 | Conroy | |
| 6,720,860 B1 | 4/2004 | Narayannaswami | |
| 6,728,601 B2 | 4/2004 | Garcia et al. | |
| 6,738,856 B1 | 5/2004 | Milley et al. | |

(Continued)

OTHER PUBLICATIONS

Robert Allan Unger, "Method and System for Processing Wireless Digital Multimedia", Office Action dated May 26, 2009 in pending U.S. Appl. No. 11/231,052.

*Primary Examiner*—Amare Mengistu
*Assistant Examiner*—Hong Zhou
(74) *Attorney, Agent, or Firm*—John L. Rogitz

(57) ABSTRACT

Multimedia from a source can be wirelessly transmitted in an infrared system to a display. To support rapid reads of data written into a slave at the display by a master at the source in accordance with I²C protocol, a master simulator on the display side continually polls the slave for changes, and maintains a shadow memory in a slave simulator at the source side current, so that reads from the master may be immediately executed from the shadow memory in the slave simulator without transmitting the wireless link.

10 Claims, 4 Drawing Sheets

U.S. PATENT DOCUMENTS

| | | |
|---|---|---|
| 6,745,270 B1 | 6/2004 | Barenys et al. |
| 6,747,878 B1 | 6/2004 | Hipp et al. |
| 6,757,748 B1 | 6/2004 | Hipp |
| 6,788,982 B1 | 9/2004 | Lapstum et al. |
| 6,801,028 B2 | 10/2004 | Kernahan et al. |
| 6,813,777 B1 | 11/2004 | Weinberger et al. |
| 6,825,644 B2 | 11/2004 | Kernahan et al. |
| 6,839,343 B2 | 1/2005 | Kelliher et al. |
| 6,841,983 B2 | 1/2005 | Thomas |
| 6,876,653 B2 | 4/2005 | Ambe et al. |
| 6,897,683 B2 | 5/2005 | Kernahan et al. |
| 6,906,500 B2 | 6/2005 | Kernahan |
| 6,917,318 B2 | 7/2005 | Lambert |
| 6,956,542 B2 | 10/2005 | Okuley et al. |
| 7,009,616 B2 | 3/2006 | Mendelson et al. ......... 345/519 |
| 7,020,121 B2 | 3/2006 | Hardacker et al. |
| 7,353,158 B2 | 4/2008 | Unger |
| 2002/0159645 A1 | 10/2002 | Kobayashi et al. |
| 2003/0025648 A1* | 2/2003 | Glen et al. .................... 345/2.3 |
| 2005/0105913 A1* | 5/2005 | Ozeki et al. .................. 398/140 |
| 2005/0134523 A1 | 6/2005 | Challener et al. |
| 2005/0135242 A1 | 6/2005 | Larsen et al. |
| 2005/0144225 A1* | 6/2005 | Anderson et al. ........... 709/203 |
| 2005/0149654 A1 | 7/2005 | Holloway et al. |
| 2006/0028397 A1 | 2/2006 | O'Rourke |
| 2006/0028398 A1 | 2/2006 | Willmore |
| 2006/0028399 A1 | 2/2006 | Glen et al. |

* cited by examiner

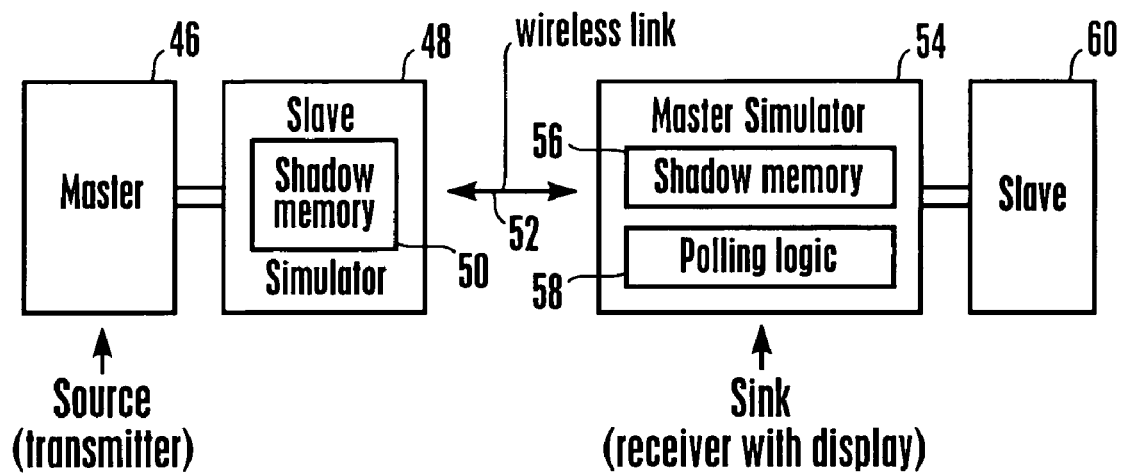
Figure 2
Figure 3
write logic
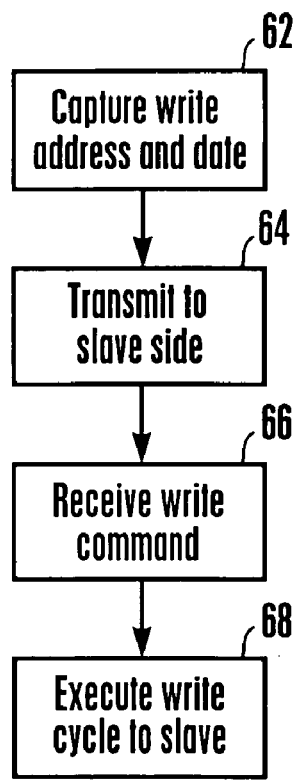
Figure 4
read preparation logic
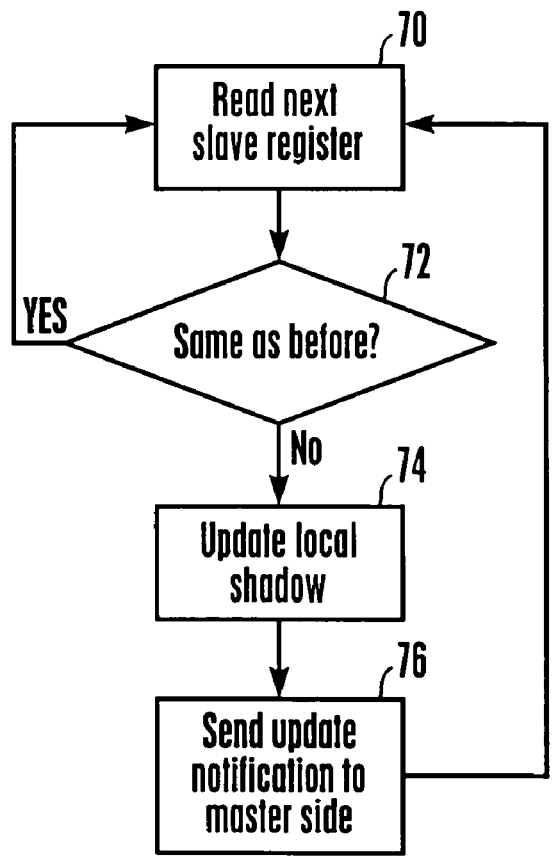

METHOD AND SYSTEM FOR WIRELESS TRANSMISSION

This application claims priority from U.S. provisional patent application Ser. No. 60/624,940, filed Nov. 3, 2004. This is a continuation-in-part of U.S. patent applications Ser. No. 11/011,865, filed Dec. 13, 2004 now U.S. Pat. No. 7,353, 158 and Ser. No. 11/036,479, filed Jan. 13, 2005, all of which are incorporated herein by reference.

FIELD OF THE INVENTION

The present invention relates generally to wireless multimedia transmission systems.

BACKGROUND OF THE INVENTION

Digital video can be transmitted from a source, such as a DVD player, video receiver, ATSC tuner, or other computer, to a display, such as a flat panel video monitor, using a protocol known as Digital Visual Interface (DVI). Having been developed primarily for computers, DVI does not provide for processing audio data.

Accordingly, to extend communication protocols to digital multimedia that includes audio for the purpose of, e.g., playing digital movies and the like, a protocol referred to as High Definition Multimedia Interface (HDMI) has been developed. HDMI is similar to DVI except it includes the use of audio as well as video data. Both DVI and HDMI are intended for wired transmission, and permit the encryption of digital multimedia using an encryption method known as High-Bandwidth Digital Content Protection (HDCP).

As recognized herein, to provide maximum placement flexibility and ease of installation, it may be desirable to present the multimedia on a display using a minimum of wiring. For instance, it may be desirable to mount a projector on the ceiling or to mount a plasma display or liquid crystal high definition (HD) television display on a wall, out of the way and capable of receiving multimedia data for display without the need for wires, since as understood herein among other things data transmission lines often do not exist in ceilings or walls.

The present invention further understands, however, that not just any wireless transmission system will do. Specifically, if a wireless link such as IEEE 802.11(b) is used that has a bandwidth which is insufficient to carry either compressed or uncompressed multimedia such as uncompressed high definition (HD) video, compressed multimedia standard definition (SD) video would have to be transmitted, requiring a relatively expensive decompression module at the projector. Some links such as IEEE 802.11(a) do have a bandwidth high enough to carry compressed HD video but not uncompressed SD or HD video. Also, in the case of 802.11(a) copyright protection maybe implicated because the link is sufficiently long range (extending beyond the room in which it originates) that it can be detected beyond the immediate location of the transmitting source. With this in mind, the present invention recognizes the need for a limited range, preferably directional, high bandwidth wireless link that is particularly suited for the short range wireless communication of uncompressed multimedia, particularly the rather voluminous genre of multimedia known as HD video.

Regardless of the particular application, the present invention makes the following critical observation. As understood herein, it is sometimes necessary for a master component (such as a microcontroller) in the source of data to read and write system information to a slave component (such as a register) in the display for control purposes using an appropriate protocol such as the I2C protocol used by DVI/HDMI. Typically, the master writes data to and reads data from register locations in the slave, and several slaves can be used, each with its own address. As an example, it might be necessary for a master in the source to write security information as might be related to the above-mentioned HDCP to one or more slaves in the display.

As further understood herein, it is desirable that reads and writes between master and slave occur in near real time, particularly in the case of encryption key exchange that is necessary to support decryption of video being played. The present invention critically recognizes that this is a challenge in wireless applications and in particular in effecting reads in wireless applications, because the read request must be transmitted across the wireless link from master to slave, acted on, and then requested data returned from slave to master over the link, potentially introducing unwanted latency.

SUMMARY OF THE INVENTION

A multimedia display system includes a source system of multimedia data and a display system of multimedia data. The display system includes a display, and the source system and display system communicate wirelessly with each other using an optical communication system. The source system has a master writing data to a slave in the display system. A slave simulator is in the source system and mirrors the slave written to by the master, so that read commands from the master may be satisfied from the slave simulator.

A master simulator may be provided in the display system in communication with the slave to update the slave simulator with changes in the slave. To this end, a first shadow memory can be provided in the slave simulator and a second shadow memory can be provided in the master simulator, with the master simulator operating in an automatic loop to compare data in the slave to data in the second shadow memory and based thereon updating the first shadow memory.

The multimedia may be, in non-limiting implementations, Digital Visual Interface (DVI) multimedia and/or High Definition Multimedia Interface (HDMI) multimedia. The wireless link may be in the infrared band. Data can be transmitted between the master and the slave using $I^2C$ protocol.

In another aspect, a system for displaying multimedia from a source system on a display system in infrared wireless communication with the source system using a wireless link includes means for writing information useful in displaying the multimedia from a master at the source system to a slave at the display system. The system also includes means for satisfying subsequent read commands from the master for the data from a slave simulator at the source system without sending the read command over the wireless link.

In yet another aspect, a method for displaying multimedia from a source on a display includes wirelessly transmitting the multimedia from the source to the display using an infrared wireless link, and writing data to a slave at the display from a master at the source using a wireless link. The method also includes periodically polling the slave for changes. Any changes are sent, over the wireless link, to at least one shadow memory at the source, so that the shadow memory mirrors contents of the slave. Read commands from the master addressed to the slave are immediately executed from the shadow memory.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a block diagram of the master and slave components;

FIG. 3 is a flow chart of the write logic;

FIG. 4 is a flow chart of the read preparation logic; and

DETAILED DESCRIPTION OF THE PREFERRED EMBODIMENT

Figure 1:
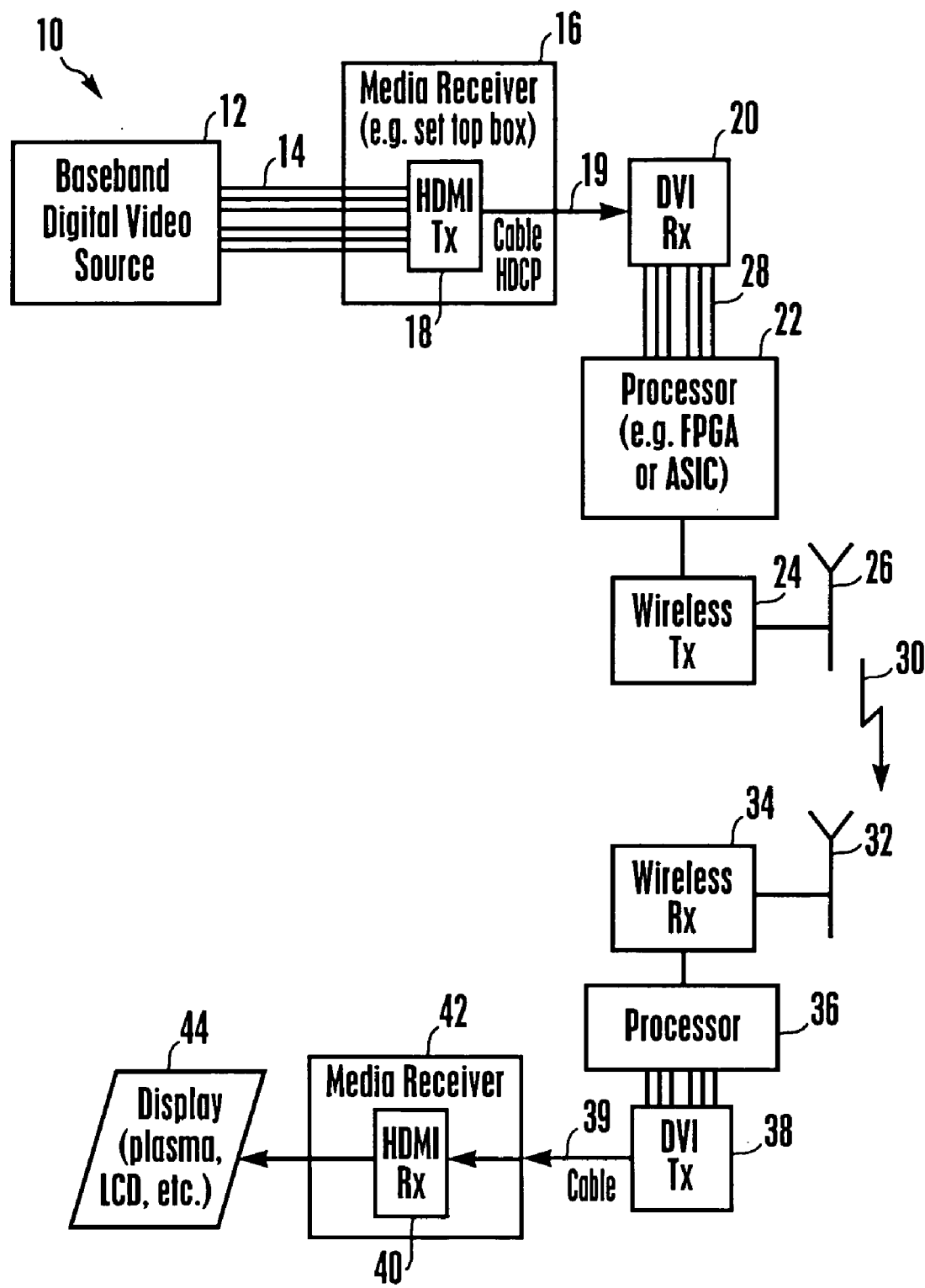
FIG. 1 is a block diagram showing a non-limiting exemplary implementation of the present system.

Referring initially to FIG. 1, a system is shown, generally designated 10, which includes a source 12 of baseband multimedia data, and in particular high definition (HD) digital video with audio. The source 12 may be a DVD player, laptop computer or other multimedia computer or server. Or, it can be a satellite, broadcast, or cable receiver, or set top box or other multimedia source, such as a video receiver, ATSC tuner, or other computer.

The source 12 sends multiplexed multimedia data over lines 14 to a media receiver 16. The media receiver 16 may be a set-top box that can include a High Definition Multimedia Interface (HDMI) transmitter 18. The HDMI transmitter 18 employs HDMI protocols to process the multimedia data by, among other things, encrypting the data using High-Bandwidth Digital Content Protection (HDCP) and supporting TV resolutions such as 16×9 display ratios.

The HDMI transmitter 18 can send HDCP-encrypted multimedia data over a cable or other wire 19 to a Digital Visual Interface (DVI) receiver 20. According to the present invention, the DVI receiver 20 uses DVI protocols to process the received data. As part of the processing the HDMI transmitter 18 multiplexes the video and multiplexes the audio within the video data stream. This can be done by multiplexing the audio into the vertical blanking interval (VBI) of the video or it can be done using the trailing edge of a clock signal, or by other means. The DVI receiver 20 demultiplexes the video while passing through the audio multiplexed within the data stream. In any case, at no time need the DVI receiver 20 decrypt or re-encrypt the stream.

The encrypted multimedia data from the VBI receiver 20 is sent to a processor 22, such as an application specific integrated circuit (ASIC) or field programmable gate array (FPGA). The processor 22 processes the data for wireless transmission by a wireless transmitter 24 over a transmitting antenna 26. The processor 22 can, among other things, re-multiplex twenty four lines of video and control signals as might be present on twenty four multiplex lines 28 into two signals such as might be required to support QPSK modulation. Additional control signals for the display may also be multiplexed within the video data stream. Also, error correction may be implemented that is appropriate for wireless transmission in accordance with wireless transmission principles known in the art. Details of a non-limiting processor can be found in the above-referenced provisional application, incorporated herein by reference.

In any case, the encrypted multimedia data is wirelessly transmitted over a wireless link 30 to a receiver antenna 32, which routes the data to a wireless receiver 34. In accordance with present principles, the link 30 carries a frequency which is sufficiently high that the signal on the link substantially cannot be received outside the room. Also, multimedia may be transmitted in an uncompr1essed form on the link 30 such that so much data is transmitted each second that bootlegging the content is essentially untenable, although some data compression less preferably may be implemented. The data may also be transmitted in compressed form if desired. The transmitter 24 and receiver 34 (and, hence, link 30) preferably operate at a fixed (unvarying, single-only) carrier frequency of approximately sixty GigaHertz (60 GHz), and more preferably in the range of 59 GHz-64 GHz, and the link 30 has a data rate, preferably fixed, of at least two Giga bits per second (2.0 Gbps). When DQPSK is used the data rate may be 2.2 Gbps, and the link may have a data rate of approximately 2.5 Gbps. The link may have a fixed bandwidth of two and half GigaHertz (2.5 GHz).

With this in mind, it may now be appreciated that the wireless transmitter 24 preferably includes an encoder for encoding in accordance with principles known in the art. The encoded data is modulated and upconverted by an upconverter for transmission over the link 30 at about 60 GHz. Using the above-described wide channel and a simpler modulation scheme such as but not limited to DQPSK, QPSK, BPSK or 8-PSK, a high data rate yet simple system can be achieved. For example, when DQPSK is used, a data rate of twice the symbol rate can be achieved. For 8-PSK a data rate of 3.3 Gbps may be achieved.

It may further be appreciated that the wireless receiver 34 includes circuitry that is complementary to the wireless transmitter 24, namely, a downconverter, a demodulator, and a decoder. In any case, the data from the wireless receiver 34 is sent to a processor 36 for error correction and re-multiplexing as appropriate for use by a DVI transmitter 38. The processor 36 can also demultiplex any control signals for the display from within the video data as might be necessary. Details of a non-limiting processor are set forth in the above-referenced provisional application.

The DVI transmitter 38 operates in accordance with DVI principles known in the art to process the encrypted multimedia without ever decrypting it, and to send the multimedia data over a cable or other wire 39 to a HDMI receiver 40 that may be part of a media player 42, such as a DVD player or TV or other player. The HDMI receiver 40 decrypts the multimedia data in accordance with HDCP principles and demultiplexes the audio data from the video data. The multimedia content may then be displayed on a display 44, such as a cathode ray tube (CRT), liquid crystal display (LCD), plasma display panel (PDP), or TFT, or projector with screen, etc.

According to the present invention, the DVI receiver 20, processor 22, and wireless transmitter 24 may be contained on a single chip, or on separate substrates. Indeed, the DVI receiver 20, processor 22, and wireless transmitter 24 may be integrated into the media receiver 16. Likewise, the wireless receiver 34, processor 36, and DVI transmitter 38 may be implemented on a single chip and may be integrated into the media player 42 if desired. In any case, the media receiver 16 and media player 42 and respective components preferably are co-located in the same space, owing to the preferred 60 GHz wireless transmission frequency, which has very limited ability to penetrate walls.

Because DVI components are used in the wireless portion of the communication path between the media receiver 16 (e.g., a set-top box) and the media player 42 (e.g., a TV or DVD player) in the non-limiting embodiment shown, no encryption keys (or concomitant licenses) are required for this portion. Also, because the multimedia is never decrypted in the wireless portion established between the DVI components 20, 38 inclusive, little or no regulatory or data rights concerns are implicated.

FIG. 2 shows the source and slave components of the present invention. It is to be understood that the source components may be implemented by, e.g., the source processor 22 and that the slave components may be implemented by, e.g., the processor 36 of the sink, i.e., of the receiver.

The source components include a master 46 that may be implemented by a suitable microcontroller. The master 48 communicates over wires with a slave simulator 48 that includes a master-side shadow memory 50, which may be implemented by, e.g., a dual port RAM. In turn, the slave simulator 48 communicates over a wireless link 52 (such as the wireless link discussed above) with a master simulator 54, and the master simulator 54 has a slave-side shadow memory 56 and logic 58 for executing the methods below. The master simulator 54 communicates over wires with a slave 60, it being understood that the master simulator 54 is essentially logically identical to the master 46 and that the slave simulator 48 is essentially logically identical to the slave 60. The master simulator 54 may be implemented by a microcontroller, and the slave simulator 48 and slave 60 can accept read and write commands in register locations. For instance, security information such as but not limited to encryption keys can be written, using the logic below, by the master 46 to the slave 60 and can be read by the master 46 from the slave 60, with the information in the slave 60 being useful by the above-described receiver (slave-side) components for presenting multimedia from the source 12. Accordingly, the shadow memories 50, 56 mirror what is in the registers of the slave 60.

FIG. 3 shows the write logic of the present invention. At block 62 the master 46 asserts a string of bits that provide the address of the slave 60 desired to be used, sub-address (e.g., of the registers desired to be used in the slave 60), and data bytes. This information is captured with appropriate handshakes, wrapped in wireless protocol, and sent through the slave simulator 48 to the slave side master simulator 54 over the wireless link 52. The write command is received by the master simulator 54 at block 66 and executed by writing the data to the slave 60 at block 68. The initially-written data can be stored in the shadow memories 50, 56 if desired, prior to the master simulator 54 executing the read preparation logic in FIG. 4. In any case, after the write has been completed to the slave 60, the receiver side (sink) components acknowledge completion of the write to the source transmitter (source) side in accordance with write principles of, e.g., the above-mentioned I²C protocol.

As recognized herein, the master 46 expects a substantially immediate response to read commands, and insufficient time may be available to send a read request over the wireless link and receive back a reply. This is the problem that the shadow memories and simulators discussed herein resolve. More specifically, referring now to FIG. 4, because the information in the slave 60 might change for various reasons, the master simulator 54 maintains the shadow memories 50, 56 current by periodically executing the logic at block 70, wherein a register in the slave 60 is read and compared, at decision diamond 72, to the corresponding data that is mirrored in the shadow memory 56 of the master simulator 54. If the data is the same the logic loops back to block 70 to test the next register of the slave 60.

However, when a change is detected in the slave 60, the logic moves from decision diamond 72 to block 74, wherein the shadow memory 56 of the master simulator 54 is updated. Proceeding to block 76, the master simulator 54 sends the update to the slave simulator 48 so that the shadow memory 50 is updated. It will readily be appreciated that if the master 46 subsequently issues a read command, it is immediately executed from the slave simulator 48, which returns a response to the master 46 without the command and response having to transit the wireless link 52. All protocol timing is maintained between the master 46 and the slave simulator 48, so that it appears to the master 46 that it is accessing the slave 60.

The polling logic of FIG. 4 may be implemented by polling through all possible sub-addresses of the slave 60, or polling only the sub-addresses known to be volatile, or some combination thereof. Thus, in some implementations, the locations in the slave 60 that are of interest to the master 46 can be learned by the master simulator 54 by observing which slave 60 addresses are being read by the master 46, and these locations may be polled exclusively or simply more frequently than other locations. Also, the logic above can be extended to more than one data type and/or device, e.g., extended display identification data (EDID) in a DVI display can be written and read using the above logic, as well as HDCP key exchanges and other data, all of which can be supported.

The above logic can be executed by one or more of the processors herein, all of which are non-limiting examples of various means for satisfying writes and read requests from the master to the slave.

Figure 5:
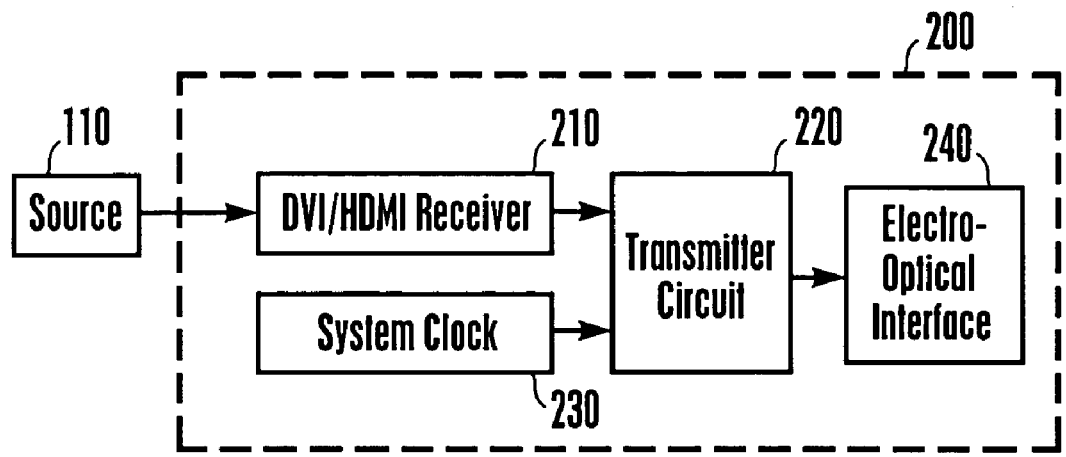
FIGS. 5-7 are block diagrams of the transmitter and receiver of an alternate transmitter that uses optical transmission.
Figure 6:
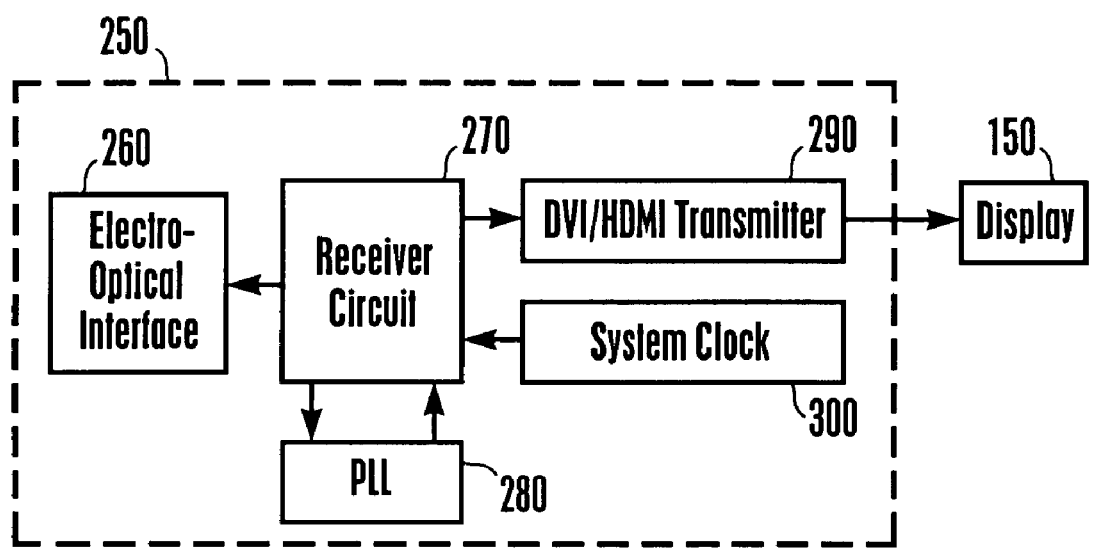
Figure 7:
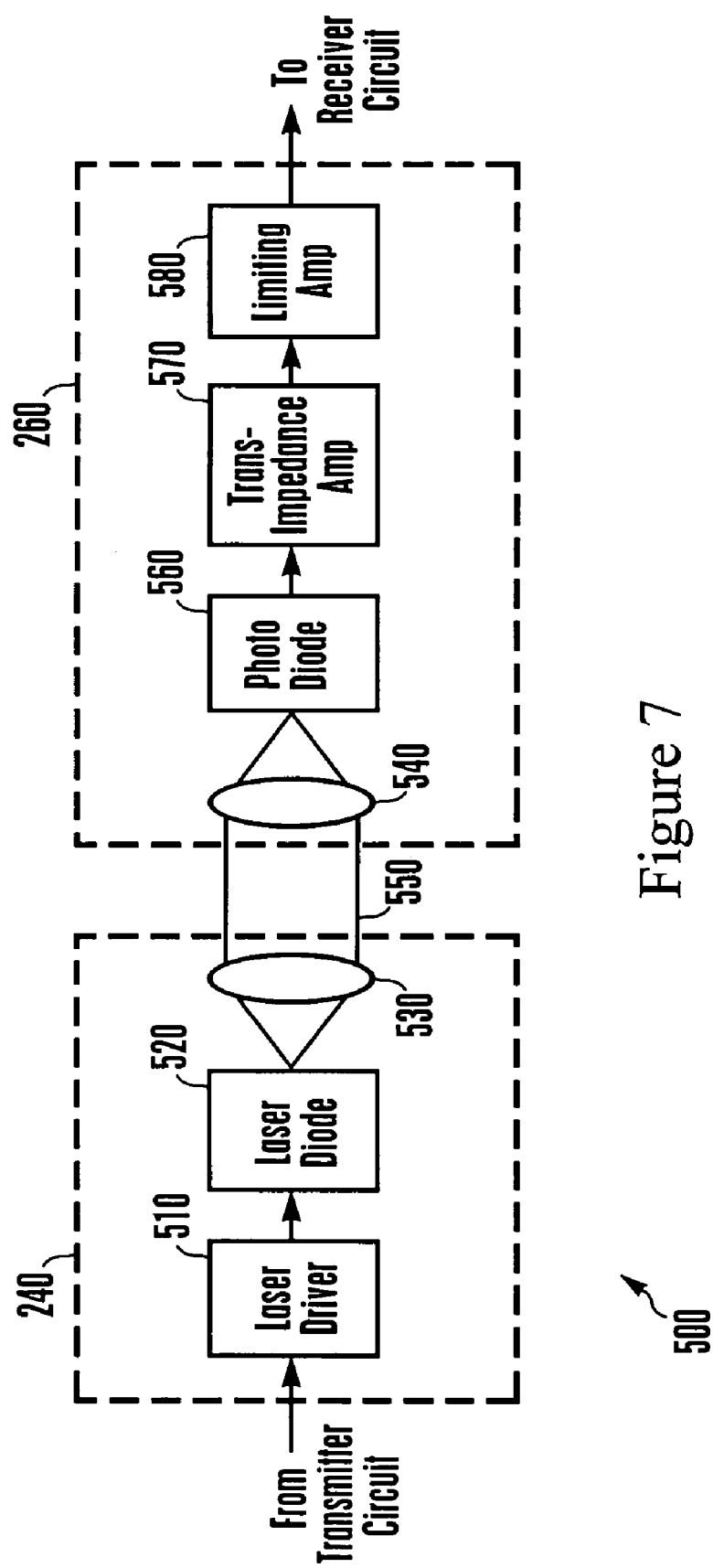

Instead of using 60 GHz, optical transmission principles may be used in lieu of the transmitter 24 and receiver 34 shown in FIG. 1. FIGS. 5-7 show such an alternate embodiment in which the wireless transmitter is an optical transmitter, in one implementation transmitting infrared energy that is encoded with the data sought to be transferred.

As shown in FIG. 5, a transmitter 200 receives the video signal from a data source 110. The transmitter 200 may includes a DVI/HDMI receiver 210, a transmitter circuit 220, a system clock 230 and a transmitter electro-optical interface 240. While in one embodiment, the data source 110 is an HDMI or DVI video source (e.g., ATSC tuner, DVD player, etc.), it may similarly be another type of data source, such as the source 12 shown in FIG. 1.

As depicted in FIG. 5, the data source 110 provides a digital signal to the DVI/HDMI receiver 210. The DVI/HDMI receiver 210 may be used to convert the DVI/HDMI digital signal from the data source 110 into a digital video signal, such as 24-bit RGB. In another embodiment, the DVI/HDMI receiver 210 and the transmitter circuit 220 may be combined into a single logical circuit. While in one embodiment, the transmitter circuit 220 may be a Field Programmable Gate Array (FPGA) or an Application-Specific Integrated Circuit (ASIC), it may similarly have other implementations. These elements may be substantially identical to the corresponding elements in FIGS. 1-4 above, except for the use of optical instead of 60 GHz transmission.

The other input for the transmitter circuit 220 comes from the system clock 230, which provides a clock signal. In one embodiment, this clock signal is a 110 MHz signal. The output of the transmitter circuit 220 is to a transmitter electro-optical interface 240.

FIG. 6 shows an optical receiver 250 that receives the optical signal from the optical transmitter 200. The receiver 250 may include a receiver electro-optical interface 260, a receiving circuit 270, a phase lock loop (PLL) 280, a DVI/HDMI transmitter 290, and a system clock 300. The optical receiver 250 is further depicted as outputting video data to a display device 150. While in one embodiment, the digital video data output to the display device 150 is one of HDMI and DVI data, it may similarly be another type of data. Except for the use of optical reception, the receiver 250 may be substantially identical to the receiver shown in FIGS. 1-4.

Accordingly, as shown in FIG. 6, the optical receiver 250 can include a DVI/HDMI transmitter 290. In another embodiment, the DVI/HDMI transmitter 290 and the receiver circuit 270 may be combined into a single logical circuit. As mentioned above, another input to the receiver circuit 270 comes from the system clock 300, which provides a clock signal. In one embodiment, this clock signal is a 110 MHz signal. The transmitter circuit 270 is further shown as being in communication with a PLL 280, which may be used to help regenerate the video clock of the DVI/HDMI transmitter 290.

Referring now to FIG. 7, a block diagram of one embodiment of an electro-optical system 500 is shown, which includes the transmitting electro-optical interface 240 of FIG. 5 communicating with the receiving electro-optical interface 260 of FIG. 6. In this embodiment, the transmitting electro-optical interface 240 provides an optical signal 550 which is received by the receiving electro-optical interface 260. In this embodiment, the transmitting circuit 220 provides the video signal in the form of a digital electrical signal to the laser driver 510 which, in turn, generates a series of electrical potentials to the laser diode 520. This sequence of electrical potentials is used by the laser diode 520 to convert the signal into an optical signal 550. Moreover, a collimating lens 530 may be used to focus the optical signal 550 such that it is properly receivable by the receiving electro-optical interface 260.

A focusing lens 540 may be used to capture and focus the optical signal 550 onto a photo diode 560. The photo diode 560 receives and converts the optical signal 550 into a digital electrical signal which may then be passed to a trans-impedance amp 570 and then to a limiting amplifier 580.

While the particular METHOD AND SYSTEM FOR WIRELESS TRANSMISSION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history. It is to be understood that while the forward channel may use optical principles or 60 GHz principles, a 2.4 GHz revese channel for transmitting control signals may be established between the receiver and transmitter. That is, the control signal path may use a different carrier than the main data carrier in some embodiments.

What is claimed is:

1. A multimedia display system, comprising:
   a source system of multimedia data;
   a display system of multimedia data, the display system including a display, the source system and display system communicating wirelessly with each other using an optical communication system;
   the source system having at least one master writing data to at least one slave in the display system;
   at least one slave simulator in the source system and mirroring at least a portion of the slave written to by the master, read commands from the master being satisfied from the slave simulator, the source system including a transmitting circuit providing the multimedia data in the form of an electrical signal to a laser driver which, in turn, controls a laser transmitter in accordance with the electrical signal to convert the electrical signal into an optical signal;
   at least one master simulator in the display system and communicating with the slave to update the slave simulator with changes in the slave;
   a first shadow memory in the slave simulator; and
   a second shadow memory in the master simulator, the master simulator operating in an automatic loop to compare data in the slave to data in the second shadow memory and based thereon updating the first shadow memory.

2. The system of claim 1, wherein the multimedia is at least one of: Digital Visual Interface (DVI) multimedia, and High Definition Multimedia Interface (HDMI) multimedia.

3. The system of claim 2, wherein the wireless link is in the infrared band.

4. The system of claim 1, wherein data is transmitted between the master and the slave at least in part using $I^2C$ protocol.

5. The system of claim 1, further comprising:
   a collimating lens focusing the optical signal such that it is properly receivable by a receiving electro-optical interface of the display system; and
   a focusing lens associated with the display system focusing the optical signal onto a photo diode, the photo diode converting the optical signal into a digital electrical signal which is passed to a trans-impedance amplifier and then to a limiting amplifier.

6. A system for displaying multimedia from a source system on a display system in infrared wireless communication with the source system using a wireless link, comprising:
   means for writing information useful in displaying the multimedia from a master at the source system to a slave at the display system;
   means for satisfying subsequent read commands from the master for the data from a slave simulator at the source system without sending the read command over the wireless link, wherein the source system includes a transmitting circuit providing the multimedia in the form of a digital electrical signal to a laser driver which, in turn, controls a laser diode, wherein the means for satisfying includes at least one master simulator in the display system and communicating with the slave to update the slave simulator with changes in the slave, a first shadow memory being in the slave simulator and a second shadow memory being in the master simulator, the master simulator comparing data in the slave to data in the second shadow memory and based thereon updating the first shadow memory.

7. The system of claim 6, wherein the slave simulator in the source system mirrors at least a portion of the slave written to by the master.

8. The system of claim 6, wherein the multimedia is at least one of: Digital Visual Interface (DVI) multimedia, and High Definition Multimedia Interface (HDMI) multimedia, the wireless link is in the infrared band, and data is transmitted between the master and the slave at least in part using I2C protocol.

9. The system of claim 6, comprising:
   a collimating lens focusing the optical signal such that it is properly receivable by a receiving electro-optical interface of the display system; and
   a focusing lens associated with the display system focusing the optical signal onto a photo diode, the photo diode converting the optical signal into a digital electrical signal which is passed to at least one amplifier.

10. A method for displaying multimedia from a source on a display, comprising:
   wirelessly transmitting the multimedia from the source to the display using an optical wireless link;
   writing data to a slave at the display from a master at the source using a wireless link;
   sending, over the wireless link, changes in the slave to at least one first shadow memory at the source, so that the first shadow memory mirrors contents of the slave; immediately executing, from the first shadow memory, read commands from the master addressed to the slave, wherein the first shadow memory is associated with a slave simulator, at least one master simulator in the display and communicating with the slave to update the slave simulator with changes in the slave, further comprising a second shadow memory associated with the master simulator, the master simulator comparing data in the slave to data in the second shadow memory and based thereon updating the first shadow memory.

* * * * *